(12) United States Patent
Chebakov et al.

(10) Patent No.: US 11,144,636 B2
(45) Date of Patent: Oct. 12, 2021

(54) SYSTEMS AND METHODS FOR IDENTIFYING UNKNOWN ATTRIBUTES OF WEB DATA FRAGMENTS WHEN LAUNCHING A WEB PAGE IN A BROWSER

(71) Applicant: AO KASPERSKY LAB, Moscow (RU)

(72) Inventors: Mikhail S. Chebakov, Moscow (RU); Ivan A. Modenov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 373 days.

(21) Appl. No.: 16/217,388

(22) Filed: Dec. 12, 2018

(65) Prior Publication Data

US 2020/0004955 A1 Jan. 2, 2020

(30) Foreign Application Priority Data

Jun. 29, 2018 (RU) .......................... RU2018123689

(51) Int. Cl.
*G06F 21/54* (2013.01)
*G06F 16/955* (2019.01)
*G06F 21/53* (2013.01)

(52) U.S. Cl.
CPC .......... *G06F 21/54* (2013.01); *G06F 16/9566* (2019.01); *G06F 21/53* (2013.01)

(58) Field of Classification Search
CPC ....... G06F 21/54; G06F 21/53; G06F 16/9566
See application file for complete search history.

(56) References Cited

U.S. PATENT DOCUMENTS

| | | |
|---|---|---|
| 5,774,670 A | 6/1998 | Montulli |
| 6,882,999 B2 | 4/2005 | Cohen et al. |
| 7,003,550 B1 | 2/2006 | Cleasby et al. |
| 7,908,437 B2 | 3/2011 | Challenger et al. |
| 7,925,694 B2 | 4/2011 | Harris |
| 8,200,833 B1 | 6/2012 | Lau |
| 8,528,076 B2 | 9/2013 | Lin |
| 8,839,422 B2 | 9/2014 | Ghosh et al. |
| 9,106,694 B2 | 8/2015 | Aziz et al. |
| 9,232,014 B2 | 1/2016 | Duterque et al. |
| 9,292,701 B1 * | 3/2016 | Chebakov ............. H04L 63/168 |
| 9,762,604 B2 | 9/2017 | Zaw |
| 2003/0191812 A1 | 10/2003 | Agarwalla et al. |
| 2005/0015429 A1 | 1/2005 | Ashley et al. |

(Continued)

FOREIGN PATENT DOCUMENTS

RU  2015115352  11/2016

OTHER PUBLICATIONS

Kristol et al., "RFC 2965: HTTP State Management Mechanism". Bell Laboratories, Lucent Technologies. Oct. 2000. 26 pages.

(Continued)

*Primary Examiner* — Hee K Song
(74) *Attorney, Agent, or Firm* — Patterson Thuente Pedersen, P.A.

(57) ABSTRACT

Systems and methods for identifying unknown attributes of web data fragments during operation of a web browser with a web page. A security engine allows for the correct displaying of a web page in a browser when no information is available about the attributes of web data fragments for the web page by identifying the attributes of web data fragments for the web page.

20 Claims, 4 Drawing Sheets

(56) References Cited

U.S. PATENT DOCUMENTS

| | | | |
|---|---|---|---|
| 2005/0015550 A1 | 1/2005 | Challenger et al. | |
| 2009/0055542 A1 | 2/2009 | Zhao et al. | |
| 2011/0191664 A1* | 8/2011 | Sheleheda | G06F 17/00 |
| | | | 715/205 |
| 2013/0262696 A1* | 10/2013 | Watanabe | H04L 63/0281 |
| | | | 709/238 |
| 2014/0281918 A1* | 9/2014 | Wei | H04L 67/02 |
| | | | 715/234 |
| 2016/0182563 A1* | 6/2016 | Sambandam | H04L 67/02 |
| | | | 726/22 |
| 2017/0366573 A1 | 12/2017 | Zaw | |
| 2018/0027085 A1* | 1/2018 | Stanislaw | H04L 67/22 |
| | | | 709/224 |
| 2018/0357326 A1* | 12/2018 | Lepeska | G06F 16/9574 |

OTHER PUBLICATIONS

EP Extended Search Report for EP19151623 dated Jul. 1, 2019.
Russian Search Report for RU2018123689 dated Jul. 29, 2018.

* cited by examiner

SYSTEMS AND METHODS FOR IDENTIFYING UNKNOWN ATTRIBUTES OF WEB DATA FRAGMENTS WHEN LAUNCHING A WEB PAGE IN A BROWSER

RELATED APPLICATION

This Application claims the benefit of Russian Federation Patent Application No. 2018123689 filed Jun. 29, 2018, which is fully incorporated by reference herein.

TECHNICAL FIELD

Embodiments relate generally to the computer security field, and more specifically, to web browser security.

BACKGROUND

A significant number of web sites exist today where navigation requires a secure connection. These include, for example, web sites of banks or payment system web sites (sites with online banking). In some cases, existing protected data transfer protocols (for example, HTTPS) are not sufficient for using such sites, because user devices may have malicious applications able to access confidential data, which can cause the user financial losses if the data is used by offenders.

Existing security applications (for example, anti-virus software) can provide additional protection. For example, browsers can be launched in a protected mode, in which all changes (saved cookie files, browsing history, etc.) remain in a secure environment and are not entered in the operating system, and therefore cannot be used by offenders. In a specific example, when a user accesses an online banking website, a security application automatically launches the browser in protected (secure) mode.

The idea of using a protected mode when operating a browser can be found in for example, U.S. Pat. No. 8,528,076, in which a method for user authorization when making online transactions through a browser is described. In another example, U.S. Pat. No. 8,839,422 describes a method for providing a secure virtual environment for the viewing of web pages.

In another example, a browser can switch to a protected mode when the security application intercepts a request sent to a server for the browser to receive a web page located at a URL address (see, for example, RU2015115352). The security application can perform a subsequent launch of the browser in a protected mode, where the security application independently identifies some web data fragments (for example, cookie files). Certain attributes of the above-mentioned web data fragments are known only to the browser and cannot be intercepted by the security application, because they are not sent by the browser together with the request to the server. As a result, the web page received in the protected browser may be displayed incorrectly. For example, web data fragments such as cookie files are identified by name and by scope. If the security application incorrectly identifies the scope of a cookie file, then when the context (including cookie files) is transferred to the browser in a protected mode, a new cookie file will be created with the identical name but a different scope. When the browser operates in a protected mode, if the server or the script in the browser changes or updates the value of the cookie files, the cookie files can be duplicated. This can cause various problems in the operation of web services; for example, the account entry field on the web page can become inoperable, cyclical redirections can occur, the server can send a duplicated cookie file to the browser, and other incorrect operation of the protected browser is also possible when displaying the web page.

Therefore, a need exists to be able to reliably and correctly display a web page in a browser when no information is available about web data fragments for the web page.

SUMMARY

Embodiments of the present application substantially meet the aforementioned needs of the industry. In particular, embodiments described herein allow for the correct displaying of a web page in a browser when no information is available about the attributes of web data fragments for the web page by identifying the attributes of web data fragments for the web page.

In an embodiment, a system for identifying unknown attributes of web data fragments during operation of a web browser with a web page comprises a computing platform including computing hardware of at least one processor and memory operably coupled to the at least one processor; and instructions that, when executed on the computing platform, cause the computing platform to implement: a web browser configured to access a networked server using an initial Universal Resource Locator (URL) request, and a security engine configured to—create a unique second URL based on the initial URL, transmit a request to the server, using the web browser, at the address of the second URL, identify at least one web data fragment based on the data transmitted with the request at the address of the second URL to the server, and identify at least one unknown attribute of the at least one web data fragment based on at least one known attribute of the identified at least one web data fragment and the second URL.

In an embodiment, a method for identifying unknown attributes of web data fragments during operation of a web browser with a web page, the web browser configured to access a networked server using an initial Universal Resource Locator (URL) request, comprises creating a unique second URL based on the initial URL; transmitting a request to the server, using the web browser, at the address of the second URL; identifying at least one web data fragment based on the data transmitted with the request at the address of the second URL to the server; and identifying at least one unknown attribute of the at least one web data fragment based on at least one known attribute of the identified at least one web data fragment and the second URL.

In an embodiment, a method for operating a web browser configured to access a networked server using an initial Universal Resource Locator (URL) request comprises launching the web browser in a protected mode based on a security determination from an operably coupled security engine; transmitting a request to the networked server, the request including a unique second URL based on the initial URL specified by the security engine and at least one cookie file, the at least one cookie file including at least one unknown attribute; receiving the at least one unknown attribute from the security engine, the at least one unknown attribute being defined by the security engine; and displaying a web page from the networked server in the web browser based on the defined at least one unknown attribute.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
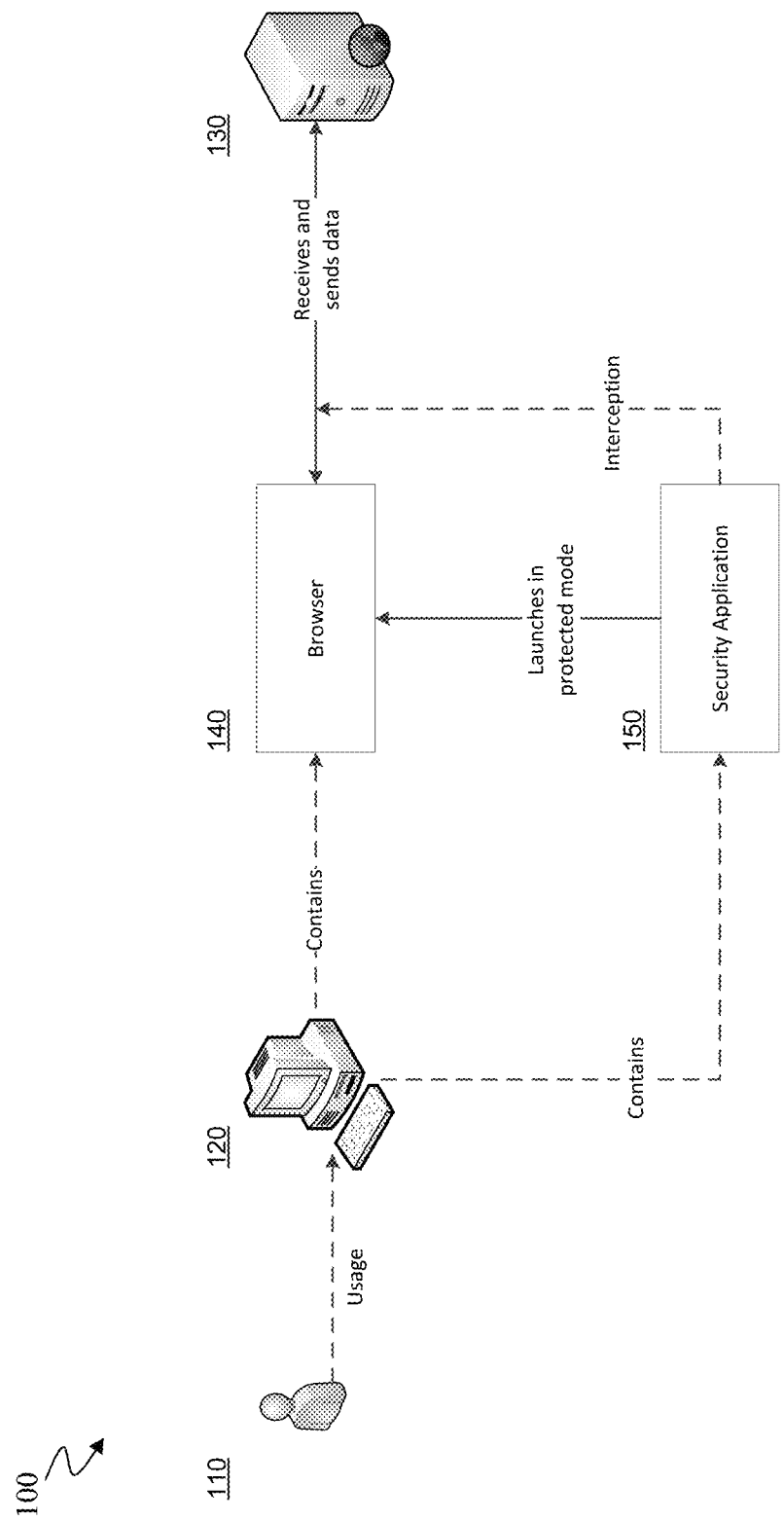
FIG. 1 is a block diagram of system including a browser moving to a protected mode when operated by a user on a network, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In an embodiment, launching a browser in a protected mode means that the browser is launched by a security application (for example, an anti-virus application) in a secure environment. In embodiments, changes (saved cookie files, browsing history, etc.) made when the browser is in a protected mode are not accessible outside the protected environment.

Referring to FIG. 1, a block diagram of a system 100 including a browser moving to a protected mode when operated by a user on a network is depicted, according to an embodiment. In embodiments, system 100 can be used to identify unknown attributes of web data when a web page is launched in a browser in protected mode. However, in other embodiments, the web page can be launched in the browser without using a protected mode. For ease of explanation, the protected mode embodiment is used hereinafter.

In an embodiment, system 100 generally comprises a computing device 120, a server 130, a browser 140, and a security application 150.

A user 110, working on the computing device 120 (for example, a personal computer, a mobile telephone, or a notebook), can access servers 130. The servers 130 can be web servers containing various web pages, mail servers, or database servers. In an embodiment, the user 110 accesses the server 130 through the browser 140. In an embodiment, the computing device 120 utilized by the user 110 can have a security application 150 installed (for example, an anti-virus application).

In operation, when the browser 140 accesses the server 130, a request is created to display a web page. In embodiments, the request contains the initial URL (Universal Resource Locator). The security application 150 intercepts the request and determines whether any actions need to be taken for additional protection of the user 110.

In an embodiment, the security application 150 can warn the user 110 about an unsafe site (e.g., a phishing site) hosted on the server 130, block access to the site, or hide the advertising hosted on the site, depending on, for example, the category determined for the server 130 (e.g. based on its URL). Additionally, when the website is determined to belong to certain categories, the security application 150 can launch the browser 140 in protected mode. For example, if the security application 150 determines that a web site is a "web banking" site, the security application 150 can launch the browser 140 in protected mode. In an embodiment, instead of determining website categories, the security application 150 can use a remote database containing a list of websites defining predetermined categories and actions of the security application 150.

In an embodiment, a browser 140 can be any application designed to perform the above-described functions.

Further, as will be described in further detail with respect to FIGS. 2-3, the security application 150 is also configured to create supplementary URLs based on the initial URL of the web page.

Figure 2:
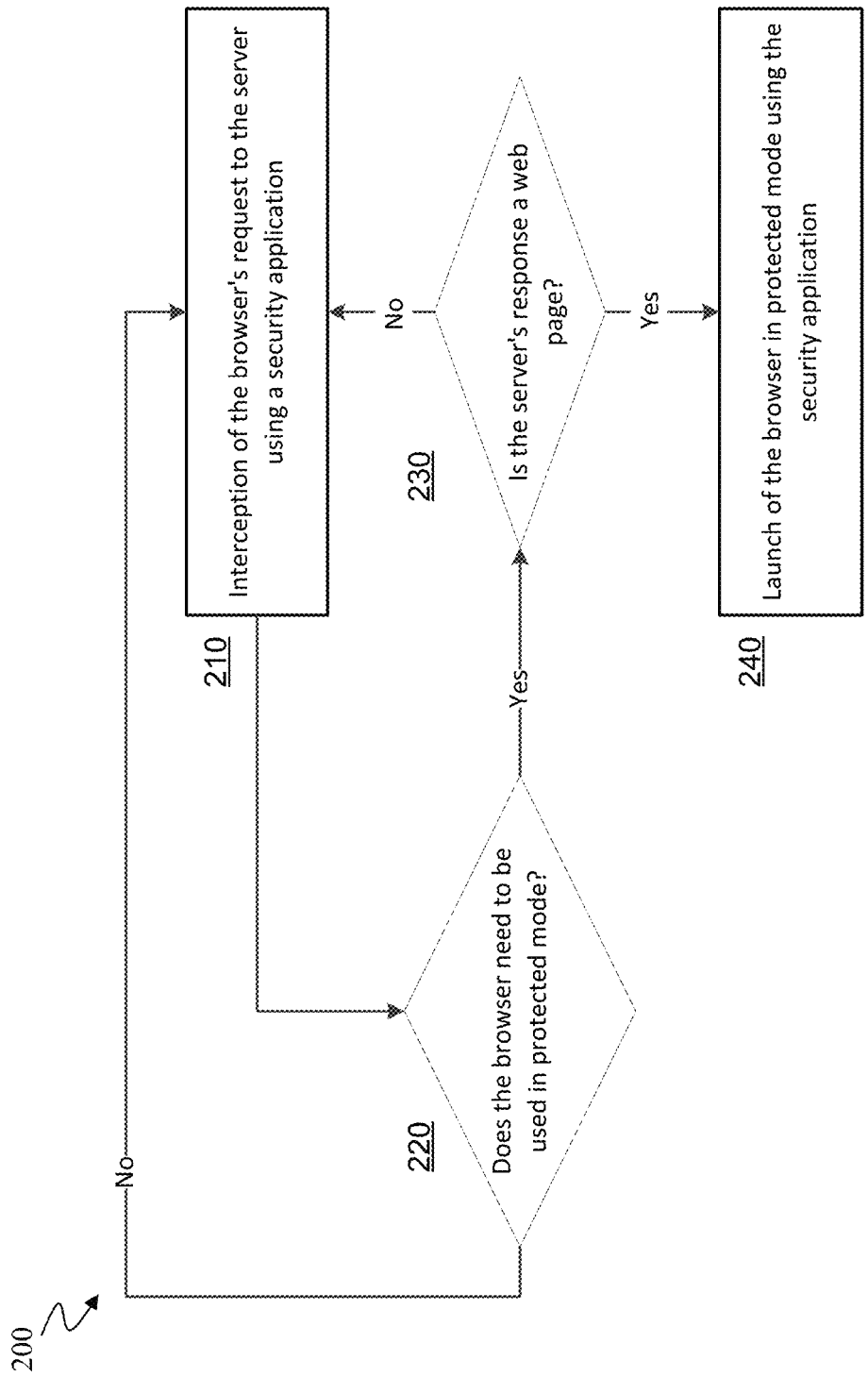
FIG. 2 is a flowchart of a method for launching a browser in protected mode, according to an embodiment.

Referring to FIG. 2, a flowchart of a method 200 for launching a browser in protected mode is depicted, according to an embodiment.

At initial stage 210, the security application 150 intercepts the request sent by the browser 140 to the server 130. At stage 220, a determination is made whether to use the browser 140 in protected mode in order to connect to the server 130. In an embodiment, the determination to run the browser 140 in protected mode can be made by the security application 150, using, for example, a website categorization module configured to check the content of the server 130, or using third-party databases containing security policies for using the server 130. If, at stage 220, it is determined the browser 140 does not need to be operated in protected mode to use the server 130, the method returns to stage 210.

If at stage 220 it is determined that the browser 140 is to be operated in protected mode in order to interact with the server 130, then, at stage 230, the security application 150 analyzes the response received from the server 130. If, at Stage 230, the security application 150 determines that the response received from the server 130 is not a web page (but, for example, an image or a streaming video), the method returns to stage 210. If, however, the response is a web page, then, at stage 240, the security application 150 creates a new unique URL. After accessing the unique URL, the security application 150 launches the browser 140 in protected mode.

Figure 3:
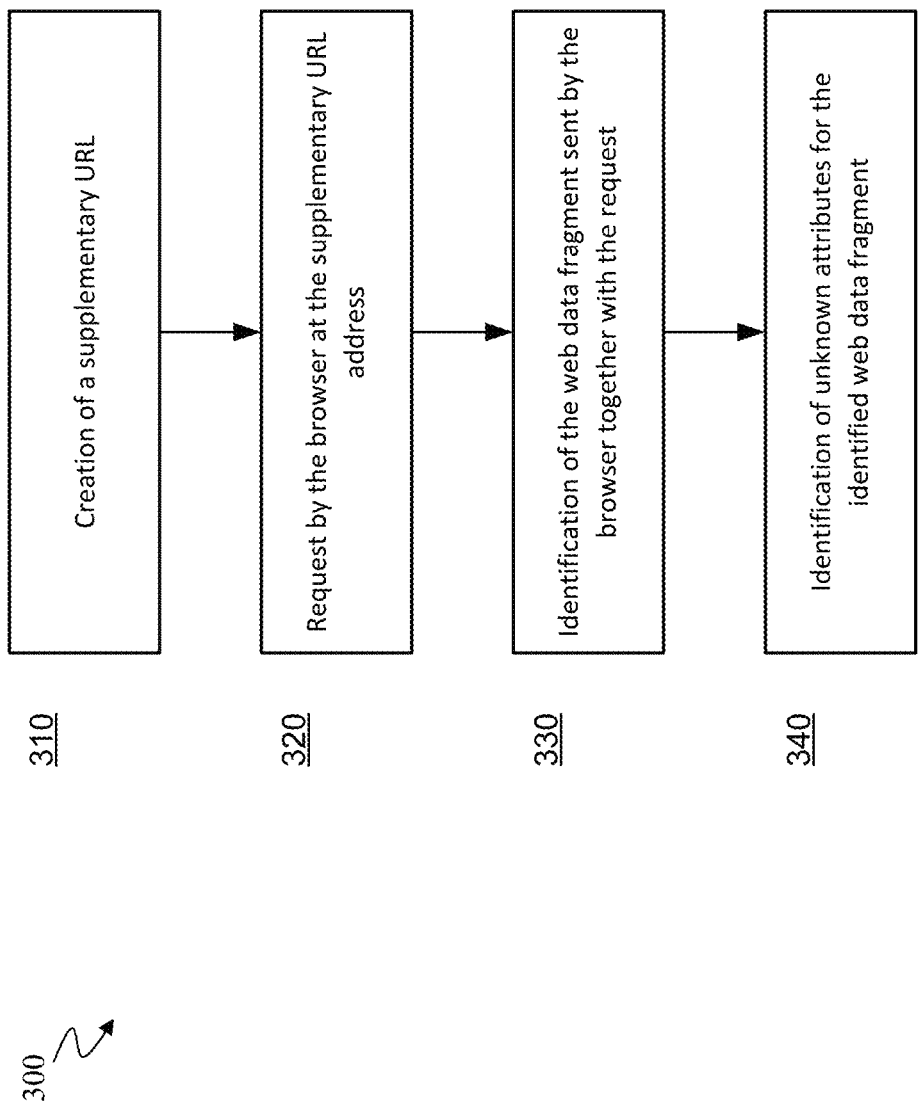
FIG. 3 is a flowchart of a method for identifying unknown attributes of web data fragments when launching a web page in a browser, according to an embodiment.

Referring also to FIG. 3, a flowchart of a method 300 for identifying unknown attributes of web data fragments when launching a web page in a browser is depicted, according to an embodiment.

After the browser 140 is launched in protected mode at stage 240, at least one supplementary URL is created based on the initial URL of the web page at stage 310 using the security application 150. Then, at stage 320, a request is sent using the browser 140 to the server 130 at the address of at least one supplementary URL. Then, at stage 330, at least one web data fragment is identified which was sent by the browser to the server during the request for at least one supplementary URL. Finally, at stage 340, at least one unknown attribute is identified for the at least one identified web data fragment. In an embodiment, the at least one unknown attribute can be identified by comparing known attributes of the identified web data fragment with at least one created supplementary URL. In that case, known attributes are the attributes of the identified web data fragment, the values of which were identified together with the web data fragment.

In one embodiment, the web data fragment can include:
a) a cookie file;
b) a web page title;
c) data of requests;
d) URL addresses of the request;
e) additionally loaded scripts;
f) addresses of additionally loaded scripts.

In a cookie file embodiment, the attribute can be one of the following: a domain, a path, a scope (e.g. domain and path), an HttpOnly attribute, or an isSecure flag. In an embodiment, the Domain specifies the hosts to which the cookie files will be sent. If no Domain is specified, then, for example, the document's domain portion (without the subdomains) or the document's domain portion with the subdomains (e.g. in the Internet Explorer browser) is specified as the scope. If a domain is specified, the scope can be composed of the document's domain part together with the subdomains. The path attribute indicates a subset of documents located at the URL address for which the cookie file value is valid. The "/" symbol means a divider of sections. In embodiments, subsections can be included as well. When path="/", the cookie file is accessible for all documents located at the URL address.

In an embodiment, the security application creates a supplementary URL by generating a random string (from characters accessible for use in the URL) and by adding it as a next level domain to the part of the initial URL that includes at least a first-level domain of the initial URL. In an embodiment, the random string is created as unique (with a great probability), to avoid coincidences with the existing domains. For example, a GUID (Globally Unique Identifier, a statistically unique 128-bit identifier) can be used as such a string. In one embodiment, a domain name is identified for the identified cookie file as the domain name of a supplementary URL, without an added random string. In another embodiment, the supplementary URLs are created by sequential removal of the upper-level domain from the domain name of the initial URL and by adding a random string as the upper-level domain; for example, the upper-level domain can be removed up to the first-level domain. In an embodiment, the domain name is identified for the identified cookie file as the domain name of one of the supplementary URLs with the fewest number of domain levels, without the added random string. For example, if the URL address of a web page is https://www.bank.com/cgi-bin/index.html, the following supplementary URLs can be created:
a) https://6B444CCD-4721-4DCF-8D39-B5C0E273E672.www.bank.com/cgi-bin/index.html;
b) https://6B444CCD-4721-4DCF-8D39-B5C0E273E672.bank.com/cgi-bin/index.html;
c) https://6B444CCD-4721-4DCF-8D39-B5C0E273E672.com/cgi-bin/index.html;
where 6B444CCD-4721-4DCF-8D39-B5C0E273E672 is the generated random string. The more domain levels the initial URL has, the more supplementary URLs can be created.

In an embodiment, the supplementary URL is created by generating a random string and adding the random string as the path or subpath to the initial URL. In another embodiment, the path is identified for the identified cookie file as the path of the supplementary URL without adding a random string. In yet another embodiment, supplementary URLs are created by sequential removal of a subpath from the initial URL and by adding a random string as a subpath. In another embodiment, the path for the identified cookie file is identified as the path of one of the shortest supplementary URLs, without the added random string. In another embodiment, the "/" path is identified for the identified cookie file, if cookie files were identified for all supplementary URLs (i.e. the cookie file will be accessible for all documents located at the URL address). For example, for the above-mentioned URL, the following supplementary URLs can be created:
a) https://www.bank.com/cgi-bin/?6B444CCD-4721-4DCF-8D39-B5C0E273E672;
b) https://www.bank.com/?6B444CCD-4721-4DCF-8D39-B5C0E273E672;
where 6B444CCD-4721-4DCF-8D39-B5C0E273E672 is the generated random string. The more subpaths the initial URL has, the more supplementary URLs can be created.

In an embodiment, the request is sent to the server at the address of the supplementary URL using a generated script (e.g. JavaScript). For example, a JavaScript script can be created that adds to the web page an empty element <IMG> (an image) containing the supplementary URL address. As a result, the browser can then access the address of the supplementary URL.

FIG. 3 is discussed more particularly below with respect to the aforementioned initial URL example: https://www.bank.com/cgi-bin/index.html. At stage 210, the browser 140 sends a request to the server 130 to receive a web page at the address of the initial URL. With the request from the browser 140, two cookie files are sent to the server 130:
1. Cookie file 1:
SessionKey
   Domain=.bank.com
   Path=/
2. Cookie file 2:
UserName
   Domain=www.bank.com
   Path=/cgi-bin/

However, in the request, only the values of the cookie files are sent (SessionKey and UserName, respectively), while the scope (the Domain and Path attributes) is not sent together with the request and is accordingly known only to the browser 140. Moreover, the scope is unknown even to the scripts being executed in the web page context. Thus, the security application 150, at stage 210, intercepts the value of cookie file 1 and cookie file 2, but the scope of the cookie files is unknown. The security application 150 knows the initial URL of the server 130 to which the browser 140 sent the request, but the initial URL may not coincide with the scope of the cookie files (the scope can cover other URLs in addition to the initial URL). At stages 220-230, a determination is made that the browser 140 needs to be used in protected mode. At stage 240, the security application 150 launches the browser 140 in protected mode. However, since the scopes for cookie file 1 and cookie file 2 are unknown, the web page at the URL address may display incorrectly. In order to solve the display problem, the embodiments described herein for identifying the unknown attributes of web data fragments can be utilized.

Embodiments thus allow for the correct display of a web page in a browser when no information is available about the attributes of web data fragments for the web page by identifying the attributes of web data fragments for the web page. In the example initial URL: https://www.bank.com/cgi-bin/index.html, at stage 310, the cookie file was sent in the request to the www.bank.com domain. Consequently, the scope can be one of the following:

"www.bank.com", ".com", ".bank.com", ".www.bank.com". Therefore, in order to identify the scope of the cookie file, at least one supplementary URL is created and the requests sent by the browser at the at least one supplementary URL are analyzed. Continuing the example here, the following supplementary URLs are created in accordance with the above-described embodiments:

1. For the Domain attribute:
   a) https://6B444CCD-4721-4DCF-8D39-B5C0E273E672.www.bank.com/cgi-bin/index.html;
   b) https://6B444CCD-4721-4DCF-8D39-B5C0E273E672.bank.com/cgi-bin/index.html;
   c) https://6B444CCD-4721-4DCF-8D39-B5C0E273E672.com/cgi-bin/index.html;
2. For the Path attribute:
   a) https://www.bank.com/cgi-bin/?6B444CCD-4721-4DCF-8D39-B5C0E273E672;
   b) https://www.bank.com/?6B444CCD-4721-4DCF-8D39-B5C0E273E672.

At stage 320, using the browser 140, a request is sent to the address of the supplementary URLs. In an embodiment, the browser 140 independently completes the identification of the other attributes of the cookie files that must correspond to the supplementary URLs. At stage 330, the security application 150 identifies the attributes sent by the browser 140 together with the request at the address of the supplementary URLs.

Continuing the example, the browser 140 can send the following cookie files together with the request:
Request 1. https://6B444CCD-4721-4DCF-8D39-B5C0E273E672.www.bank.com/cgi-bin/index.html
SessionKey
Request 2. https://6B444CCD-4721-4DCF-8D39-B5C0E273E672.bank.com/cgi-bin/index.html
SessionKey
Request 3. https://6B444CCD-4721-4DCF-8D39-B5C0E273E672.com/cgi-bin/index.html Since there is no UserName attribute in the cookie files sent by the browser 140, the following is identified for cookie file 2: Domain=www.bank.com.

The SessionKey value was sent by the browser 140 to Request 2, but was not sent to Request 3. Therefore, the following attribute can be identified for cookie file 1: Domain=.bank.com/.

Embodiments can identify the Path attributes in a similar manner. For example, the browser 140 sends the following cookie files together with the request:
Request 4. https://www.bank.com/cgi-bin/?6B444CCD-4721-4DCF-8D39-B5C0E273E672
SessionKey
UserName
Request 5. https://www.bank.com/?6B444CCD-4721-4DCF-8D39-B5C0E273E672
SessionKey The SessionKey value is sent by the browser in both Request 4 and Request 5. Therefore, the path attribute can be identified as Path=/(the cookie file is accessible for all documents located at the URL address).

The UserName value was sent by the browser 140 to Request 4 but was absent in Request 5. Therefore, the path attribute can be identified as Path=/cgi-bin.

Figure 4:
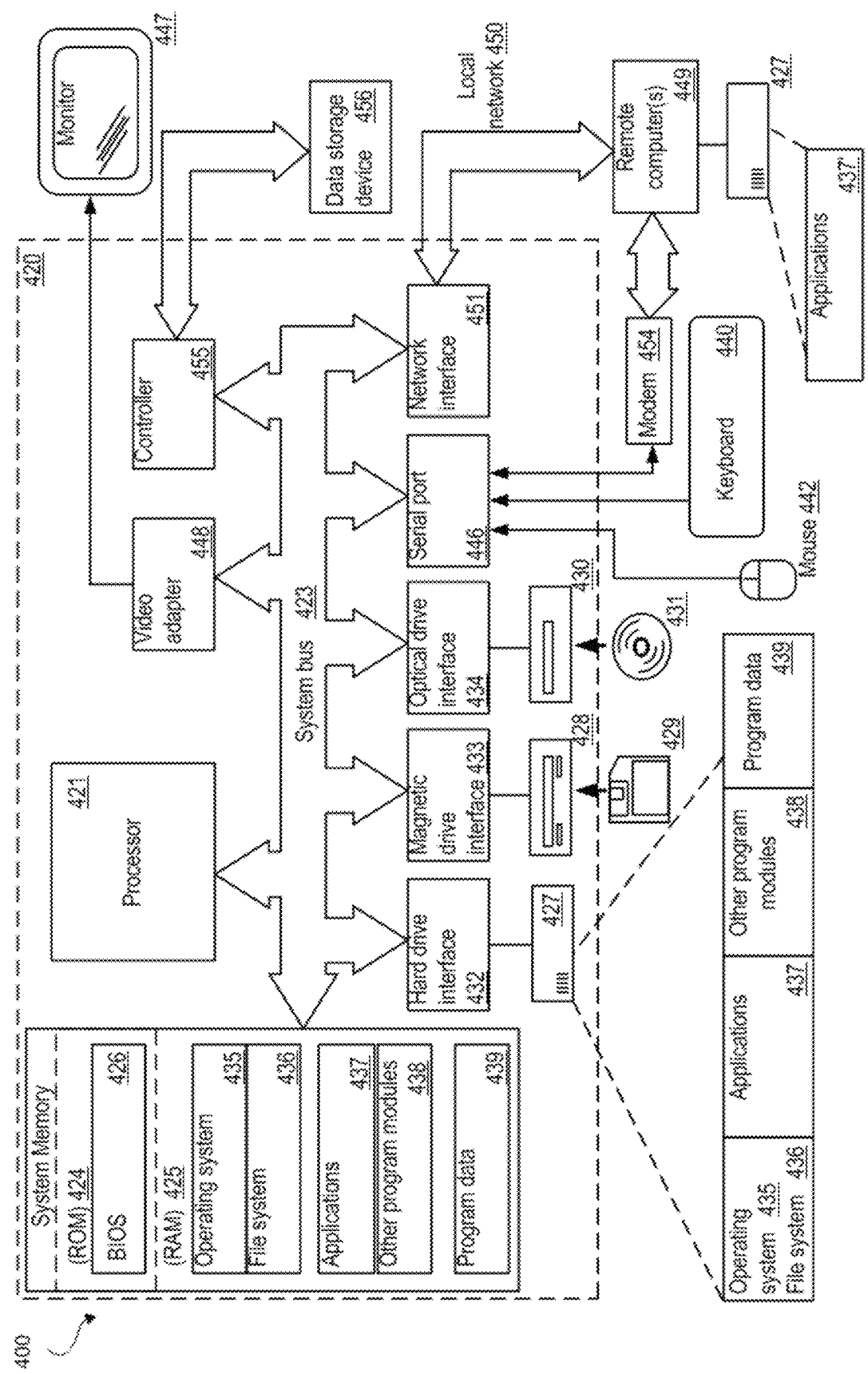
FIG. 4 is a block diagram of a computer system configured to implement embodiments.

Referring to FIG. 4, a diagram illustrating in greater detail a computer system 400 on which aspects of the invention as described herein may be implemented according to various embodiments is depicted.

The computer system 400 can comprise a computing device such as a personal computer 420 includes one or more processing units 421, a system memory 422 and a system bus 423, which contains various system components, including a memory connected with the one or more processing units 421. In various embodiments, the processing units 421 can include multiple logical cores that are able to process information stored on computer readable media. The system bus 423 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 424 or volatile memory such as Random Access Memory (RAM) 425. The Basic Input/Output System (BIOS) 426 contains basic procedures ensuring transfer of information between the elements of personal computer 420, for example, during the operating system boot using ROM 424.

Personal computer 420, in turn, has a hard drive 427 for data reading and writing, a magnetic disk drive 428 for reading and writing on removable magnetic disks 429, and an optical drive 430 for reading and writing on removable optical disks 431, such as CD-ROM, DVD-ROM and other optical media. The hard drive 427, the magnetic drive 428, and the optical drive 430 are connected with system bus 423 through a hard drive interface 432, a magnetic drive interface 433 and an optical drive interface 434, respectively. The drives and the corresponding computer information media represent energy-independent means for storage of computer instructions, data structures, program modules and other data on personal computer 420.

The system depicted includes hard drive 427, a removable magnetic drive 429 and a removable optical drive 430, but it should be understood that it is possible to use other types of computer media, capable of storing data in a computer-readable form (solid state drives, flash memory cards, digital disks, random-access memory (RAM), etc.), connected to system bus 423 through a controller 455.

The computer 420 comprises a file system 436, where the recorded operating system 435 is stored, as well as additional program applications 437, other program engines 438 and program data 439. The user can input commands and information into the personal computer 420 using input devices (keyboard 440, mouse 442). Other input devices (not shown) can also be used, such as: a microphone, a joystick, a game console, a scanner, etc. Such input devices are usually connected to the computer system 420 through a serial port 446, which, in turn, is connected to a system bus, but they can also be connected in a different way—for example, using a parallel port, a game port or a Universal Serial Bus (USB). The monitor 447 or another type of display device is also connected to system bus 423 through an interface, such as a video adapter 448. In addition to monitor 447, personal computer 420 can be equipped with other peripheral output devices (not shown), such as speakers, a printer, etc.

Personal computer 420 is able to work in a network environment; in this case, it uses a network connection with one or several other remote computers 449. Remote computer(s) 449 is (are) similar personal computers or servers, which have most or all of the above elements, noted earlier when describing the substance of personal computer 420 shown in FIG. 4. The computing network can also have other devices, such as routers, network stations, peering devices or other network nodes.

Network connections can constitute a Local Area Network (LAN) 450 and a World Area Network (WAN). Such networks are used in corporate computer networks or in corporate intranets, and usually have access to the Internet. In LAN or WAN networks, personal computer 420 is connected to the Local Area Network 450 through a network adapter or a network interface 451. When using networks, personal computer 420 can use a modem 454 or other means for connection to a world area network, such as the Internet. Modem 454, which is an internal or an external device, is connected to system bus 423 through serial port 446. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for identifying unknown attributes of web data fragments during operation of a web browser with a web page, the system comprising:
   a computing platform including computing hardware of at least one processor and memory operably coupled to the at least one processor; and
   instructions that, when executed on the computing platform, cause the computing platform to implement:
      a web browser configured to access a networked server using an initial Universal Resource Locator (URL) request, and
      a security engine configured to
         create a unique second URL based on the initial URL,
         transmit a request to the server, using the web browser, at the address of the second URL,
         identify at least one web data fragment based on the data transmitted with the request at the address of the second URL by the web browser to the server, and
         identify at least one unknown attribute of the at least one web data fragment based on at least one known attribute of the identified at least one web data fragment and the second URL.

2. The system of claim 1, wherein the security engine is further configured to display a web page in the web browser based on the identified at least one unknown attribute.

3. The system of claim 1, wherein the web browser is operated in a protected mode.

4. The system of claim 3, wherein the security engine is configured to determine that the web browser is to be operated in the protected mode by checking content of the server.

5. The system of claim 3, wherein the security engine is configured to determine that the web browser is to be operated in the protected mode by evaluating a security policy for using the server.

6. The system of claim 1, wherein the at least one web data fragment is at least one of a cookie file, a web page title, data related to a request, a URL related to a request, an additionally loaded session, or an address of an additionally loaded session.

7. The system of claim 6, wherein the at least one web data fragment is a cookie file and the at least one unknown attribute is at least one of a domain, a path, a scope, an HttpOnly attribute or a Secure attribute.

8. The system of claim 1, wherein the security engine is configured to create the unique second URL by concatenating a random string to at least one level of the domain of the initial URL.

9. The system of claim 8, wherein the at least one web data fragment is a cookie file and the security engine is configured to identify a domain attribute based on the web browser completion of a request using the cookie file corresponding to the second URL.

10. The system of claim 1, wherein the security engine is configured to create the unique second URL by concatenating a random string to a path or subpath of the initial URL.

11. The system of claim 10, wherein the at least one web data fragment is a cookie file and the security engine is configured to identify a path or subpath attribute based on the web browser completion of a request using the cookie file corresponding to the second URL.

12. A method for identifying unknown attributes of web data fragments during operation of a web browser with a web page, the web browser configured to access a networked server using an initial Universal Resource Locator (URL) request, the method comprising:
   creating a unique second URL based on the initial URL;
   transmitting a request to the server, using the web browser, at the address of the second URL;

identifying at least one web data fragment based on the data transmitted with the request at the address of the second URL by the web browser to the server; and identifying at least one unknown attribute of the at least one web data fragment based on at least one known attribute of the identified at least one web data fragment and the second URL.

13. The method of claim 12, further comprising displaying a web page in the web browser based on the identified at least one unknown attribute.

14. The method of claim 12, wherein creating the unique second URL based on the initial URL comprises concatenating a random string to at least one level of the domain of the initial URL.

15. The method of claim 14, wherein the at least one web data fragment is a cookie file and the method further comprises identifying a domain attribute based on the web browser completion of a request using the cookie file corresponding to the second URL.

16. The method of claim 12, wherein creating the unique second URL based on the initial URL comprises concatenating a random string to a path or subpath of the initial URL.

17. The method of claim 16, wherein the at least one web data fragment is a cookie file and the method further comprises identifying a path or subpath attribute based on the web browser completion of a request using the cookie file corresponding to the second URL.

18. A method for operating a web browser configured to access a networked server using an initial Universal Resource Locator (URL) request, the method comprising:

launching the web browser in a protected mode based on a security determination from an operably coupled security engine;

transmitting a request to the networked server, the request including a unique second URL based on the initial URL specified by the security engine and at least one cookie file, the at least one cookie file including at least one unknown attribute;

receiving the at least one unknown attribute from the security engine, the at least one unknown attribute being defined by the security engine; and displaying a web page from the networked server in the web browser based on the defined at least one unknown attribute.

19. The method of claim 18, wherein the at least one unknown attribute is unknown to the web browser and the time of receiving the at least one unknown attribute from the security engine.

20. The method of claim 18, wherein the at least one unknown attribute is at least one of a domain, a path, a scope, an HttpOnly attribute or a Secure attribute.

* * * * *